United States Patent
Mackey (10) Patent No.: US 9,557,860 B2
(45) Date of Patent: Jan. 31, 2017

(54) SWITCHABLE AREA ENHANCEMENT FOR FLEXIBLE CAPACITIVE SENSING

(71) Applicant: SYNAPTICS INCORPORATED, San Jose, CA (US)

(72) Inventor: Bob Lee Mackey, Santa Clara, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 475 days.

(21) Appl. No.: 13/973,951

(22) Filed: Aug. 22, 2013

(65) Prior Publication Data

US 2015/0054752 A1    Feb. 26, 2015

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ................... G06F 3/044; G06F 3/0418; G06F 2203/04107
USPC ...................... 178/18.01–19.07; 345/173–178
See application file for complete search history.

(56) References Cited

U.S. PATENT DOCUMENTS

| | | | |
|---|---|---|---|
| 6,239,788 B1 | 5/2001 | Nohno et al. | |
| 6,937,031 B2* | 8/2005 | Yoshioka | G06K 9/00087 |
| | | | 324/662 |
| 7,859,521 B2 | 12/2010 | Hotelling et al. | |
| 7,995,041 B2 | 8/2011 | Chang | |
| 8,217,913 B2 | 7/2012 | Hotelling et al. | |
| 8,243,027 B2 | 8/2012 | Hotelling et al. | |
| 8,274,492 B2 | 9/2012 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2010/0001973 A1 | 1/2010 | Hotelling et al. | |
| 2010/0193257 A1 | 8/2010 | Hotelling et al. | |
| 2010/0194696 A1 | 8/2010 | Chang et al. | |
| 2010/0194697 A1 | 8/2010 | Hotelling et al. | |
| 2010/0194698 A1 | 8/2010 | Hotelling et al. | |
| 2010/0253638 A1 | 10/2010 | Yousefpor et al. | |
| 2011/0050585 A1 | 3/2011 | Hotelling et al. | |
| 2011/0187677 A1 | 8/2011 | Hotelling et al. | |
| 2011/0216033 A1* | 9/2011 | Mamba | G06F 3/044 |
| | | | 345/174 |
| 2011/0248949 A1 | 10/2011 | Chang et al. | |
| 2011/0298727 A1 | 12/2011 | Yousefpor et al. | |
| 2011/0298744 A1* | 12/2011 | Souchkov | G06F 3/044 |
| | | | 345/174 |
| 2011/0298746 A1 | 12/2011 | Hotelling | |
| 2012/0098776 A1 | 4/2012 | Chen et al. | |

(Continued)

*Primary Examiner* — Michael Pervan
(74) *Attorney, Agent, or Firm* — Patterson + Sheridan, LLP (57) ABSTRACT

Embodiments of the invention generally provide an input device having a plurality of sensor electrodes that can be configured to be scanned in a first direction or a second direction. The input device includes a set of sensor electrodes and first and second sets of buses. The first buses are oriented in a first direction and the second buses are oriented in a second direction. The input device also includes a set of switching elements that are each configured to couple one of the sensor electrodes to either a bus in the first set of buses or a bus in the second set of buses. These embodiments allow the sensor electrodes to be scanned in a variety of patterns for flexible sensing functionality.

19 Claims, 5 Drawing Sheets

(56) References Cited

U.S. PATENT DOCUMENTS

2013/0050116 A1\* 2/2013 Shin ........................ G06F 3/044
                                                              345/173

\* cited by examiner

SWITCHABLE AREA ENHANCEMENT FOR FLEXIBLE CAPACITIVE SENSING

BACKGROUND OF THE INVENTION

Field of the Invention

Embodiments of the present invention generally relate to a system and method for flexible sensor electrode utilization in a proximity sensing device.

Description of the Related Art

Touch sensor devices (also commonly called touch pads or touch screens) are widely used in a variety of electronic systems. A touch sensor device is typically a sensitive surface that uses capacitive, resistive, inductive, optical, acoustic or other technology to determine the presence, location and or motion of one or more fingers, styli, and/or other objects. The touch sensor device, together with a finger or other object provides an input to the electronic system. For example, touch sensor devices are used as input devices for computers, such as notebook computers.

Conventional touch sensor devices include transmitter electrodes arranged in a predefined pattern. To sense the presence of an input object, the transmitter electrodes are "scanned," typically in an order that is based on the direction in which the transmitter electrodes are oriented. For example, with horizontally oriented transmitter electrodes, the transmitter electrodes are scanned vertically, row-by-row. While such a configuration is simple to implement, having the transmitter electrodes locked in a predefined pattern will not provide robust sensing in many applications.

Therefore, there is a need for an improved touch sensor device.

SUMMARY OF THE INVENTION

Embodiments of the invention generally provide a method and apparatus configured to allow input sensing using a plurality of sensor electrodes, wherein a pattern of sensor electrodes within the plurality of sensor electrodes may be selectively changed. A pattern may include any of one or more sensor electrodes within the plurality of sensor electrodes. Selectively changing the pattern may include varying the area or location of one or more electrodes during input sensing. These embodiments allow the sensor electrodes to be scanned in a variety of patterns for flexible sensing functionality.

In one embodiment, an input device is provided that includes a first plurality of buses selectively coupled to a plurality of sensor electrodes, a second plurality of buses ohmically separated from the first plurality of buses, and a plurality of switching elements. The second plurality of buses may be selectively coupled to the sensor electrodes. Each switching element in the plurality of switching elements is paired with a sensor electrode in the plurality of sensor electrodes. A first switching element in the plurality of switching elements is operable to couple the sensor electrode to either a first bus in the first plurality of buses or a second bus in the second plurality of buses.

In another embodiment, a processing system for an input device is provided that includes a transmitter module and a determining module. The transmitter module is configured to drive first signals with a first plurality of buses when the first plurality of buses is coupled to one or more sensor electrodes in a plurality of sensor electrodes. The transmitter module is also configured to drive second signals with a second plurality of buses when the second plurality of buses is coupled to the one or more sensor electrodes in the plurality of sensor electrodes. The determining module is configured to determine presence or lack thereof of an input object based on signals received in response to driving signals with the first plurality of buses. The determining module is also configured to determine presence or lack thereof of the input object based on signals received in response to driving signals with the second plurality of buses.

In yet another embodiment, a method for operating an input device includes coupling one or more sensor electrodes defining a first group of sensor electrodes to a first bus, sensing presence or lack thereof of an input object utilizing the first group of sensor electrodes, coupling one or more sensor electrodes that include at least one electrode in the first group of sensor electrodes and define a second group of sensor electrodes to the first bus, and sensing presence or lack thereof of the input object utilizing the second group of sensor electrodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention generally provide an input device that includes sensor electrodes that may be selectively arranged in an arbitrary "sensing pattern." Each of the sensing electrodes is selectively coupled to transmitter circuitry. The transmitter circuitry may drive one or more of the sensing electrodes in either a trans-capacitance mode or a self-capacitance mode. This configuration provides a flexible sensor array that can be scanned in an arbitrary manner so that at least one of the location or area of the sensing pattern may be selectively configured (i.e., changed) as desired, for example in response to a predefined touch or proximity event (or lack thereof).

Figure 1:
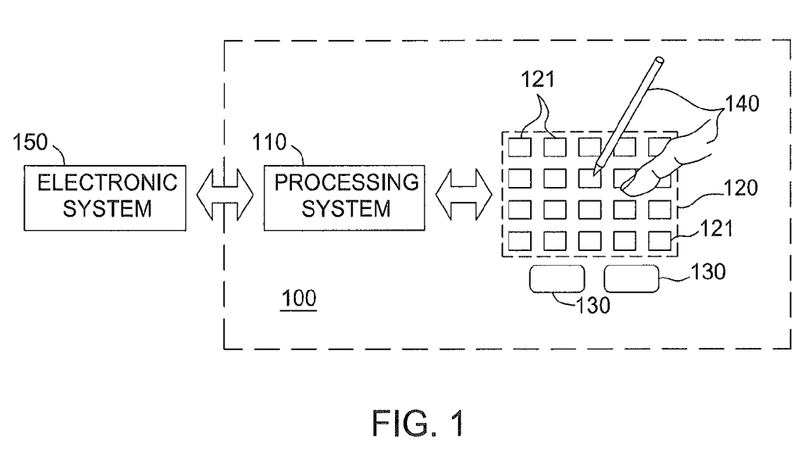
FIG. 1 is a schematic block diagram of an exemplary input device, in accordance with embodiments of the invention.

FIG. 1 is a block diagram of an exemplary input device 100, in accordance with embodiments of the invention. In FIG. 1, the input device 100 is a proximity sensor device (e.g., "touchpad," "touch screen," "touch sensor device") configured to sense inputs provided by one or more input objects 140 positioned in a sensing region 120. Example input objects include fingers and styli, as shown in FIG. 1. In some embodiments of the invention, the input device 100 may be configured to provide input to an electronic system 150, which is sometime referred to herein as the "host." As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include input device 100 and separate joysticks or key switches. Further examples of electronic systems 150 include peripherals, such as data input devices (e.g., remote controls and mice) and data output devices (e.g., display screens and printers). Other examples include remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system. As appropriate, the input device 100 may communicate with parts of the electronic system 150 using any one or more of the following: buses, networks, and other wired or wireless interconnections. Examples include I²C, SPI, PS/2, Universal Serial Bus (USB), Bluetooth, RF, and IRDA.

Sensing region 120 encompasses any space above, around, in and/or near the input device 100 in which the input device 100 is able to detect user input by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 generally comprises one or more sensing elements 121 for detecting user input. As several non-limiting examples, the one or more sensing elements 121 in the input device 100 may use capacitive, elastive, resistive, inductive, magnetic acoustic, ultrasonic, and/or optical techniques to detect the position or motion of the input object(s) 140. Some implementations are configured to provide sensing images that span one, two, three, or higher dimensional spaces.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing elements 121 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the input device 100. Each module may comprise circuitry that is a part of the processing system 110, firmware, software, or a combination thereof. In various embodiments, different combinations of modules may be used. In one example, modules include hardware operation modules for operating hardware such as sensing elements and display screens, data processing modules for processing data, such as sensor signals, and positional information, and reporting modules for reporting information. In another example, modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. In one example, as noted above, actions may include changing operation modes, as well as GUI actions, such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system process information received from the processing system 110 is used to act on user input, such as to facilitate a full range of actions, including mode changing actions and GUI actions. For example, in some embodiments, the processing system 110 operates the sensing element(s) 121 of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline set of data (e.g., baseline image), such that the information reflects a difference between the acquired electrical signals (e.g., sensing image) and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of a display device (not shown). For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device may share physical elements. Some embodiments of the input device 100 include at least part of the display device. For example, some embodiments may utilize some of the same electrical components for displaying and sensing. In some examples, the display screen of the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In many embodiments, the positional information of the input object 140 relative to the sensing region 120 is monitored or sensed by use of one or more sensing elements 121 (FIG. 1) that are positioned to detect its "positional information." In general, the sensing elements 121 may comprise one or more sensing elements or components that are used to detect the presence of an input object. As discussed above, the one or more sensing elements 121 of the input device 100 may use capacitive, elastive, resistive, inductive, magnetic acoustic, ultrasonic, and/or optical techniques to sense the positional information of an input object. While the information presented below primarily discuses the operation of an input device 100, which uses capacitive sensing techniques to monitor or determine the positional information of an input object 140 this configuration is not intended to be limiting as to the scope of the invention described herein, since other sensing techniques may be used.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In one embodiment of the input device 100, the sensing element 121 is a capacitive sensing element that is used to sense the positional information of the input object(s). In some capacitive implementations of the input device 100, voltage or current is applied to the sensing elements to create an electric field between an electrode and ground. Nearby input objects 140 cause changes in the electric field, and produce detectable changes in capacitive coupling that may be detected as changes in voltage, current, or the like. Some capacitive implementations utilize arrays or other regular or irregular patterns of capacitive sensing elements to create electric fields. In some capacitive implementations, portions of separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between one or more sensing elements, or one or more sensor electrodes, and an input object. In various embodiments, an at least partially grounded input object positioned near the sensor electrodes alters the electric field near the sensor electrodes, thus changing the measured capacitive coupling of the sensor electrodes to ground. In one implementation, an absolute capacitance sensing method operates by modulating sensor electrodes with respect to a reference voltage (e.g., system ground), and by detecting the capacitive coupling between the sensor electrodes and the at least partially grounded input object(s).

Some capacitive implementations utilize "mutual capacitance" (or "transcapacitance") sensing methods based on changes in the capacitive coupling between two or more sensing elements (e.g., sensor electrodes). In various embodiments, an input object near the sensor electrodes alters the electric field created between the sensor electrodes, thus changing the measured capacitive coupling. In one implementation, a transcapacitive sensing method operates by detecting the capacitive coupling between one or more transmitter sensor electrodes (also "transmitter electrodes," "transmitting electrodes" or "transmitters") and one or more receiver sensor electrodes (also "receiver electrodes" or "receiving electrodes"). Transmitter sensor electrodes may be modulated relative to a reference voltage (e.g., system ground) to transmit transmitter signals. Receiver sensor electrodes may be held substantially constant relative to the reference voltage to facilitate receipt of "resulting signals." A "resulting signal" may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some implementations user input from an actively modulated device (e.g. an active pen) may act as a transmitter such that each of the sensor electrodes acts as a receiver to determine the position of the actively modulated device.

Most conventional multi-touch sensing sensor devices, in which the location of more than one finger or other input can be accurately determined, comprise a matrix of transmitter sensor electrodes and receiver sensor electrodes. Conventionally, during operation, capacitive images are formed by measuring the capacitance formed between each transmitter and receiver sensor electrode (referred to as "transcapacitance" or "mutual capacitance"), forming a matrix or grid of capacitive detecting elements across the sensing region 120. The presence of an input object (such as a finger or other object) at or near an intersection between transmitter and receiver sensor electrodes changes the measured "transcapacitance". These changes are localized to the location of object, where each transcapacitive measurement is a pixel of a "capacitive image" and multiple transcapacitive measurements can be utilized to form a capacitive image of the object.

Herein sensor design and sensing scheme embodiments are described that allow the creation of 2-D capacitance images using a single sensing layer in which all of the transmitting and receiving sensor electrodes are disposed in a single common layer with one another without the use of jumpers within the sensor area. The electronics to drive the sensor are located in a processing system, such as processing system 110 described herein. These described embodiments also facilitate contact sensing, proximity sensing, and position sensing. These described embodiments also facilitate "multi-touch" sensing, such as two finger rotation gestures and two finger pinch gestures, but with a less expensive sensor compared to a sensor that utilizes sensor electrodes in multiple layers. The reduced number of layers used to form the input device described herein versus other conventional position sensing devices also equates to fewer production steps, which in itself will reduce the production cost of the device. The reduction in the layers of the input device also decreases interference or obscuration of an image or display that is viewed through the sensor, thus lending itself to improved optical quality of the formed input device when it is integrated with a display device. Additional electrodes involved in sensing the shape of the electric fields of the transmitters and receivers, such as floating electrodes or shielding electrodes, may be included in the device and may be placed on other substrates or layers. The electrodes may be part of a display (share a substrate) and may even share functionality with the display (used for both display and sensing functionality). For example electrodes may be patterned in the Color filter of an LCD (Liquid Crystal Display) or on the sealing layer of an OLED (Organic Light Emitting Diode) display. Alternately, sensing electrodes within the display or on TFT (Thin Film Transistor) layer of an active matrix display may also be used as gate or source drivers. Such electrodes may be patterned (e.g. spaced or oriented at an angle relative to the pixels) such that they minimize any visual artifacts. Furthermore, they may use hiding layers (e.g. Black Mask between pixels) to hide at least some portion of one or more conductive electrodes.

Figure 2:
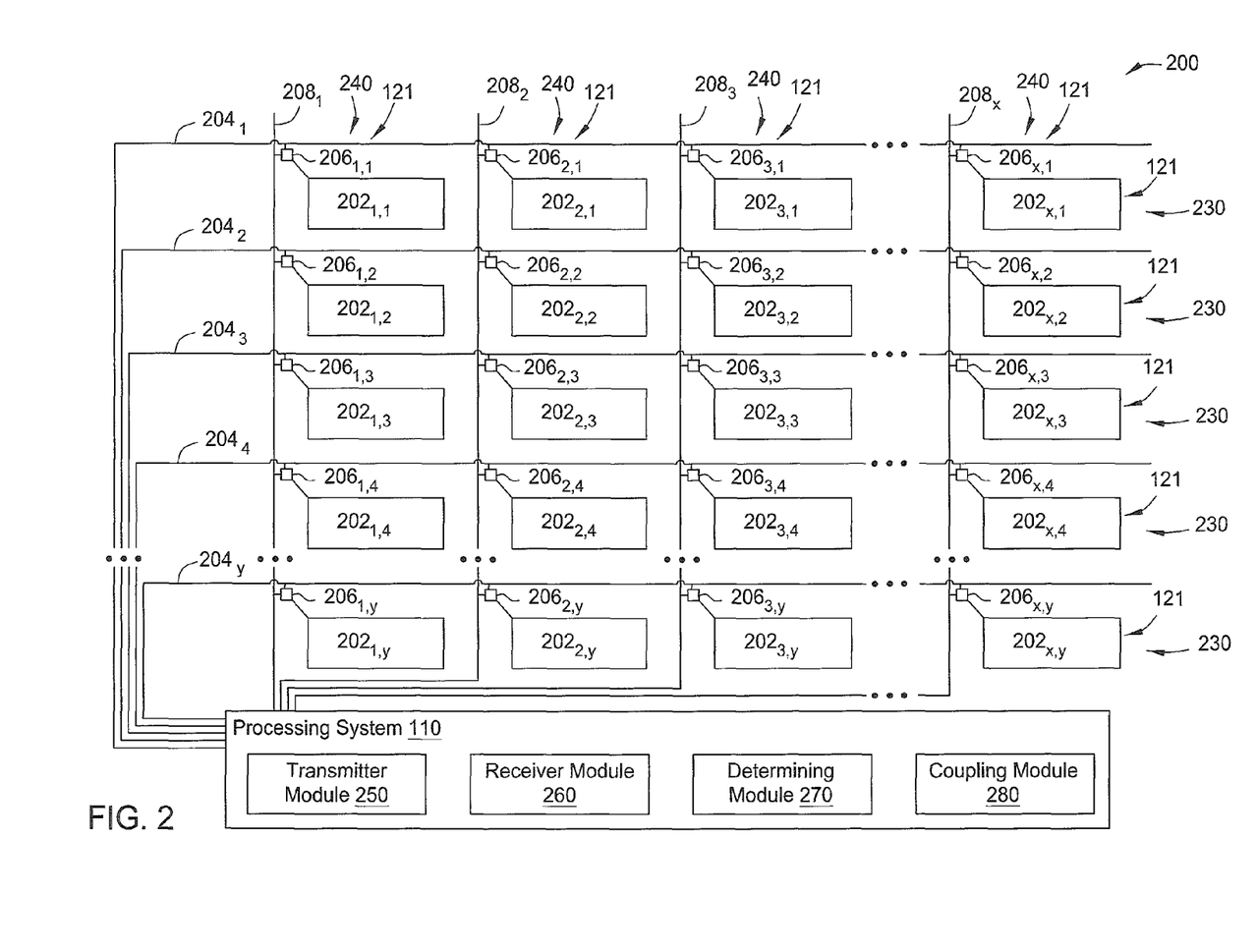
FIG. 2 illustrates a stack-up of a sensor assembly that may be used in the input device to sense the input object, according to an embodiment described herein.

FIG. 2 shows a portion of an exemplary pattern 200 of sensing elements 121 configured to sense in a sensing region 120 associated with the pattern 200, according to some embodiments. For clarity of illustration and description, FIG. 2 shows the sensing elements 121 arranged in a pattern of simple rectangles. Further, FIG. 2 depicts an embodiment in which the pattern 200 of sensing elements 121 includes sensor electrodes 202, first buses 204, and second buses 208 are arranged in a grid pattern. In other embodiments, one or more of the sensor electrodes 202, first buses 204, and second buses 208 may be shaped and arranged in different patterns. For example, the sensor electrodes 202 may be hexagonal and form a hexagonal grid, among other patterns. In some embodiments, the sensor electrodes 202 are arranged in a regular, or repeating pattern. In some embodiments, the first buses 204 and second buses 208 are also arranged in a regular, or repeating, pattern.

In one embodiment, the first buses 204 are arranged orthogonally to the second buses 208. The first buses 204 are ohmically isolated from the second buses 208. That is, one or more insulators, such as a dielectric material or air gap, separate the first buses 204 from the second buses 208. It is contemplated that the orientation of the buses 204, 208 may be other than orthogonal.

The sensing elements 121 also include a switching element 206. Each switching element 206 is configured to selectively couple either one of the first buses 204 or one of the second buses 208 to an associated one of the sensor electrodes 202. When one of the first buses 204 is coupled to the sensor electrode 202, the first bus 204 may be configured to drive the sensor electrode 202 with signals. Similarly, when one of the second buses 208 is coupled to the sensor electrode 202, the second bus 208 may be configured to drive the sensor electrode 202 with signals. Each sensor electrode 202 may be operated in a trans-capacitance or self-capacitance mode.

In trans-capacitance mode, a bus that is oriented in a first direction (for example, horizontally) is coupled to a sensor electrode 202 and drives the sensor electrode 202 with transmitter signals. A bus that is oriented in a second direction (for example, vertically) receives resulting signals that are generated as a result of driving the sensor electrode 202. In other words, the bus oriented in the second direction, itself, acts as a receiver electrode when the bus oriented in the first direction is utilized to drive a signal onto the sensor electrode 202. The capacitive coupling between the sensor electrode 202 and either the first bus 204 or second bus 208 (i.e., the bus not utilized to drive the sensor electrode 202) changes with the proximity and motion of input objects in the sensing region associated with the sensor elements 121, and thus affects the resulting signals that are received on the non-driven bus.

In trans-capacitance mode, the sensor electrodes 202 may be operated such that one sensor electrode 202 is driven alone with transmitter signals, or multiple sensor electrodes 202 are driven with transmitter signals at the same time. Where multiple sensor electrodes 202 are driven simultaneously, one or more of the first buses 204 or one or more of the second buses 208 may be driven with transmitter signals at the same time. Further, where multiple sensor electrodes 202 are driven simultaneously, the multiple sensor electrodes 202 may be driven with the same transmitter signal and produce an effectively larger transmitter electrode, or the multiple sensor electrodes 202 may be driven with different transmitter signals.

In self-capacitance mode, in one embodiment, a bus that is coupled to a sensor electrode 202 drives a sensor electrode 202 with a signal. In other embodiments not shown, other elements may drive the sensor electrodes while the bus receives signals in response. If an input object 140 is present, the electrical characteristics on that bus indicate an amount of capacitive coupling between the sensor electrode 202 and the input object 140. As with trans-capacitance mode, in self-capacitance mode, any of first buses 204 or second buses 208 may be coupled to corresponding sensor electrodes 202 and may be configured to drive the sensor electrodes 202 with signals. Also, as with trans-capacitance mode, in self-capacitance mode, the sensor electrodes 202 may be operated such that one sensor electrode 202 is driven with signals alone, or multiple sensor electrodes 202 are driven with signals at the same time. Where multiple sensor electrodes 202 are driven simultaneously, one or more of the first buses 204 and/or one or more of the second buses 208 may be driven with signals at the same time.

In either self-capacitance mode or trans-capacitance mode, a set of measurements received from one or more of the first buses 204 or one or more of the second buses 208 form a "capacitive frame" representative of the capacitive couplings at each sensor electrode 202. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

In the embodiment depicted in FIG. 2, the processing system 110 includes a transmitter module 250, a receiver module 260, a determining module 270, and a coupling module 280. The transmitter module 250 includes transmitter circuitry for generating and providing signals to one or more of the first buses 204 and one or more of the second buses 208, and for detecting changes in capacitance between a sensor electrode 202 and an input object 140 in self-capacitance mode. The receiver module 260 is configured to receive resulting signals through one or more of the first buses 204 and one or more of the second buses 208 in trans-capacitance mode, and may include receiver circuitry configured to receive the resulting signals.

The determining module 270 is configured to make determinations based on the signals received in response to driving to the first buses 204 or second buses 208 with signals. For example, the determining module may determine, based on signals received in response to driving a bus in the first buses 204 or a bus in the second buses 208, the presence of an input object 140 in a sensing region 120 proximate the sensor electrodes 202.

In some embodiments, a coupling module 280 is configured to selectively couple or decouple the transmitter module 250 and receiver module 260 from any of the first buses 204 or the second buses 208. The coupling module may include one or more multiplexers configured to selectively couple one or more first buses 204 or second buses 208 to the transmitter module 250 or to the receiver module 260. The multiplexers may be located in the processing system 110 or on the substrate on which the sensor electrodes 202 are deposited. The coupling module 280 may also be configured to transmit coupling signals to the switching elements 206 to cause the switching elements to independently couple a respective one of the sensor electrodes 202 to either a first bus 204, a second bus 208, or to none of the buses 204, 208.

Although FIG. 2 depicts an embodiment in which each first bus 204 is selectively coupled to a row 230 of sensor electrodes 202 and each second bus 208 is selectively coupled to a column 240 of sensor electrodes 202, other configurations are contemplated. For example, each first bus 204 in the plurality of first buses, or each second bus 208 in the plurality of second buses may be coupled to a single one of the sensor electrodes 202, or alternatively, to a plurality of the sensor electrodes 202. When one of the buses 204, 208 is coupled to a set of sensor electrodes 202, the set of sensor electrodes 202 may be configured in a row, a column, a "square" of sensor electrodes 202, a "rectangle" of sensor electrodes 202, a diagonal line of electrodes 202, or to any other combination of sensor electrodes 202.

In some embodiments, arbitrary sensing patterns are possible. In other words, signals from transmitter module 250 may be driven to any combination of selected sensor electrodes 202 in order to sense capacitive coupling in either trans-capacitance or self-capacitance mode. Some example sensing patterns are described below.

In one exemplary sensing pattern, a group of sensor electrodes 202 are coupled to a common bus to form a larger sensor electrode. In a configuration in which multiple sensor electrodes 202 are coupled to a common bus to form a larger sensor electrode, each sensor electrode 202 is a sensor electrode element of the larger sensor electrode. In the exemplary sensing pattern, larger sensor electrodes are scanned two-by-two in a horizontal direction in trans-capacitance mode. In the following discussion, the two subscripts following reference numerals 202, 204 and 206 refers to the X/Y position of the sensing elements 121 within the pattern 200. More specifically, switching element $206_{1,1}$ couples sensor electrode $202_{1,1}$ to first bus $204_1$ and switching element $206_{1,2}$ couples sensor electrode $202_{1,2}$ to first bus $204_2$. Subsequently, transmitter module 250 transmits transmitter signals to sensor electrodes $202_{1,1}$ and $202_{1,2}$ and the receiver module 260 receives resulting signals with second bus $208_1$. Switching element $206_{1,1}$ then decouples sensor electrode $202_{1,1}$ from first bus $204_1$ and switching element $206_{1,2}$ decouples sensor electrode $202_{1,2}$ from first bus $204_2$.

Next, switching element $206_{2,1}$ couples sensor electrode $202_{2,1}$ to first bus $204_1$ and switching element $206_{1,2}$ couples sensor electrode $202_{2,2}$ to first bus $204_2$. Subsequently, transmitter module 250 drives transmitter signals to sensor electrodes $202_{2,1}$ and $202_{2,2}$ and the receiver module 260 receives resulting signals with second bus $208_2$. Switching element $206_{2,1}$ then decouples sensor electrode $202_{2,1}$ from first bus $204_1$ and switching element $206_{2,2}$ decouples sensor electrode $202_{2,2}$ from first bus $204_2$.

Next, switching element $206_{3,1}$ couples sensor electrode $202_{3,1}$ to first bus $204_1$ and switching element $206_{3,2}$ couples sensor electrode $202_{3,2}$ to first bus $204_2$. Subsequently, transmitter module 250 drives transmitter signals to sensor electrodes $202_{3,1}$ and $202_{3,2}$ and the receiver module 260 receives resulting signals with second bus $208_2$. Switching element $206_{3,1}$ then decouples sensor electrode $202_{3,1}$ from first bus $204_1$ and switching element $206_{3,2}$ decouples sensor electrode $202_{3,2}$ from first bus $204_2$.

The sequence of coupling and decoupling the sensor electrodes 202 is repeated until all the electrodes $202_{x,y}$ are cycled through coupling to the transmitter module 250 and receiver module 260.

In another example sensing pattern, sensor electrodes 202 are driven in rows and then in columns in self-capacitance mode for profile sensing. More specifically, the corresponding switching elements 206 couple sensor electrode $202_{1,1}$, sensor electrode $202_{2,1}$, sensor electrode $202_{3,1}$, sensor electrode $202_{4,1}$, and so on, to first bus $204_1$. Further, the corresponding switching elements 206 couple sensor electrode $206_{1,2}$, sensor electrode $206_{2,2}$, sensor electrode $206_{3,2}$, and so on, to first bus $204_2$. Similarly, the corresponding switching elements 206 couple sensor electrodes 202 in the next row to first bus $204_3$, and so on. Subsequently, each row is driven with a signal and a signal is received in response.

After driving the sensor electrodes 202 in rows, the sensor electrodes are driven in columns. More specifically, the corresponding switching elements 206 couple sensor electrode $202_{1,1}$, sensor electrode $202_{1,2}$, sensor electrode $202_{1,3}$, sensor electrode $202_{1,4}$, and so on, to second bus $208_1$. Further, the corresponding switching elements 206 couple sensor electrode $206_{2,1}$, sensor electrode $206_{2,2}$, sensor electrode $206_{2,3}$, sensor electrode $206_{2,3}$, and so on, to second bus $208_2$. Similarly, the corresponding switching elements 206 couple sensor electrodes 202 in the next row to second bus $208_3$, and so on. Subsequently, each column is driven with a signal and a signal is received in response.

In another example sensing pattern, more than one row 230 or column 240 is driven at the same time in order to generate a coarse capacitive frame. If the coarse capacitive frame indicates the presence of an input object, then a finer capacitive frame may be generated. More specifically, after detecting the presence of an input object, the sensor electrodes 202 may be driven row-by-row or column-by-column only in the general area in which the input object was detected.

Certain scanning patterns are useful for certain applications. In one example, buttons are displayed on a touch screen that includes pattern 200. To detect the proximity of an input device 140 over each button, sensor electrodes 202 in the vicinity of each button are coupled to buses and are scanned together.

In some embodiments, the switching elements 206 may be configured to automatically couple a sensor electrode 202 to one of the first buses 204 or the second buses 208, based on which bus is being driven with a signal. In other words, applying a signal to a first bus 204 will cause a sensing electrode 202 to be coupled to that first bus 204. Similarly, applying a transmitter signal to a second bus 208 will cause a sensing electrode 202 to be coupled to that second bus 208.

In some embodiments, first buses 204 and second buses 208 are separated by insulative material disposed between them at cross-over areas; in such constructions, the first buses 204 and/or second buses 208 may be formed with jumpers connecting different portions of the same electrode. In some embodiments, first buses 204 and second buses 208 are separated by one or more layers of insulative material. In some other embodiments, first buses 204 and second buses 208 are separated by one or more substrates; for example, the first buses 204 and second buses 208 may be disposed on opposite sides of the same substrate, or on different substrates that are laminated together.

In some touch screen embodiments, sensor electrodes 202 comprise one or more common electrodes (e.g., "V-com electrode" or source drive electrode, gate electrodes or other display elements) used in updating the display of the display screen. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each sensor electrode 202 comprises one or more common electrodes. In other embodiments, at least two sensor electrodes 202 may share at least one common electrode.

In some embodiments, the sensing elements 121 do not include the switching elements 206. Rather, the switching elements 206 are located laterally outward of the plan area defined by the pattern 200 of the sensor electrodes 202. In such embodiments, the switching elements 206 may be grouped together on the same substrate as the sensing elements 121, but not within the pattern 200. In other embodiments, the switching elements 206 may be located within the processing system 110, or in the flex tail coupling the switching elements 206 to the processing system 110.

Figure 3A:
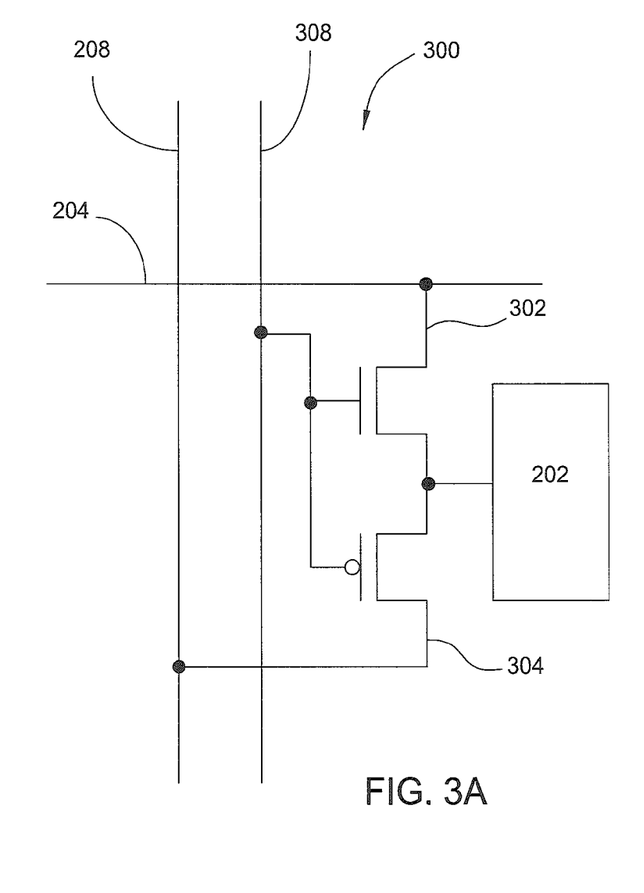
FIG. 3A illustrates a switching element for coupling a sensor electrode to either a first bus or a second bus, according to an embodiment described herein.

FIG. 3A illustrates a switching element 300 for coupling a sensor electrode 202 to either a first bus 204 or a second bus 208, according to an embodiment described herein. The switching element 300 may be utilized as the switching elements 206 depicted in FIG. 2. Switching element 300 includes a first transistor 302 and a second transistor 304. The first transistor 302 is an n-type transistor. The second transistor 304 is a p-type transistor. The source of the first transistor 302 is coupled to the first bus 204. The source of the second transistor 304 is coupled to the second bus 208. The gate of the first transistor 302 and the gate of the second transistor 304 are both coupled to the selector bus 308. The drain of the first transistor 302 and the drain of the second transistor 304 are coupled to each other and to the sensor electrode 202.

In some embodiments, the selector bus 308 may receive output from a comparator unit that detects a difference in voltage between a first bus 204 and a second bus 208. If the first bus 204 has a greater voltage than the second bus 208, then the output of the comparator unit is a high voltage. If the first bus 204 has a lower voltage than the second bus 208, then the output of the comparator unit is a low voltage. The voltage on the first bus 204 is greater than voltage on the second bus 208 when the first bus 204 is driven with a transmitter signal. Therefore, when the first bus 204 is driven with a transmitter signal, the first bus will automatically be coupled to the sensor electrode 202. Similarly, the voltage on the second bus 208 is greater than the voltage on the first bus 204 when the second bus 208 is driven with a transmitter signal. Therefore, when the second bus 208 is driven with a transmitter signal, the second bus 208 is automatically coupled to the sensor electrode 202. When utilized in a pattern 200 of sensing elements 121 as shown in FIG. 2, driving the voltage on one the buses 204, 208 may be utilized to serially connect a set of sensor electrodes 202 in a respective row 230 or column 240.

In other embodiments, the processing system 110 drives the selector bus 308 to cause the switching element 300 to couple either the first bus 204 or the second bus 208 to the sensor electrode 202. When the selector bus 308 is driven to a high voltage, the first transistor 302 passes current from the first bus 204 to the sensor electrode 202, but the second transistor 304 passes negligible current from the second bus 208 to the sensor electrode 202. Therefore, a transmitter signal applied to the first bus 204 can drive the sensor electrode 202.

Figure 3B:
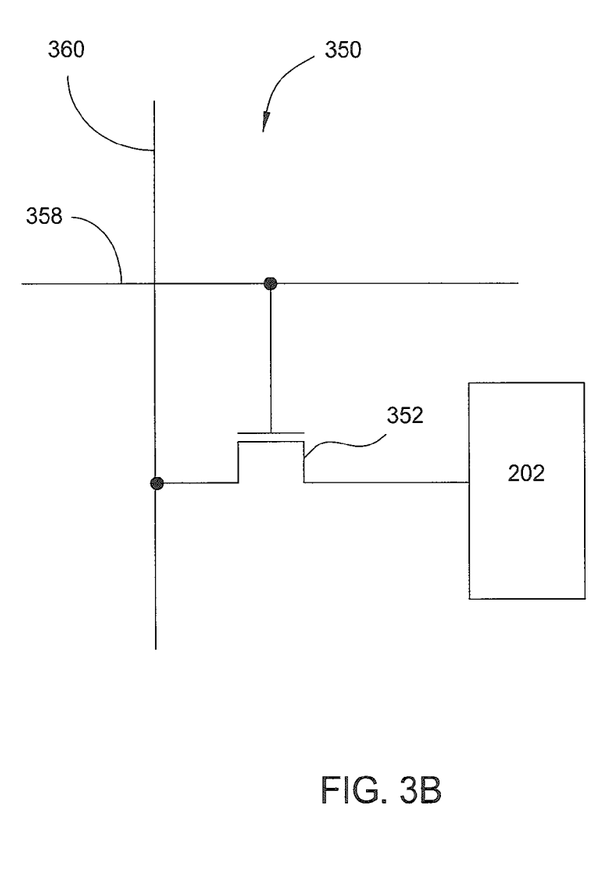
FIG. 3B illustrates a switching element for coupling a sensor electrode to either a first bus or a second bus, according to another embodiment described herein.

FIG. 3B illustrates a switching element 350 for coupling a sensor electrode 202 to either a first bus 204 or a second bus 208, according to an embodiment described herein. The switching element 350 may also be utilized as the switching elements 206 depicted in FIG. 2.

Switching element 350 includes a transistor 352. The gate of the transistor 352 is coupled to a selector bus 358 and the source of the first transistor is coupled to an input bus 360. The drain of the transistor 352 is coupled to the sensor electrode 202. The input bus 360 transmits a signal either from a first bus 204 or a second bus 208.

Each sensing element 121 may include two or more of the switching elements 350. The source of a first switching element 350 is coupled to a first bus 204 and the source of a second switching element 350 is coupled to a second bus 208. The selector bus 358 selects input from either of the first bus 204 or the second bus 208. The drain of the transistor 352 in both of the switching elements 350 is coupled to the sensor electrode 202.

In some embodiments, the selector bus 358 is coupled to a comparator unit that compares whether the voltage on the bus coupled to the source of the transistor 352 is greater than a threshold level. If the voltage is greater, than the comparator unit provides a high voltage to the gate of the transistor 352, which causes the transistor to pass the signal on the bus.

Figure 4:
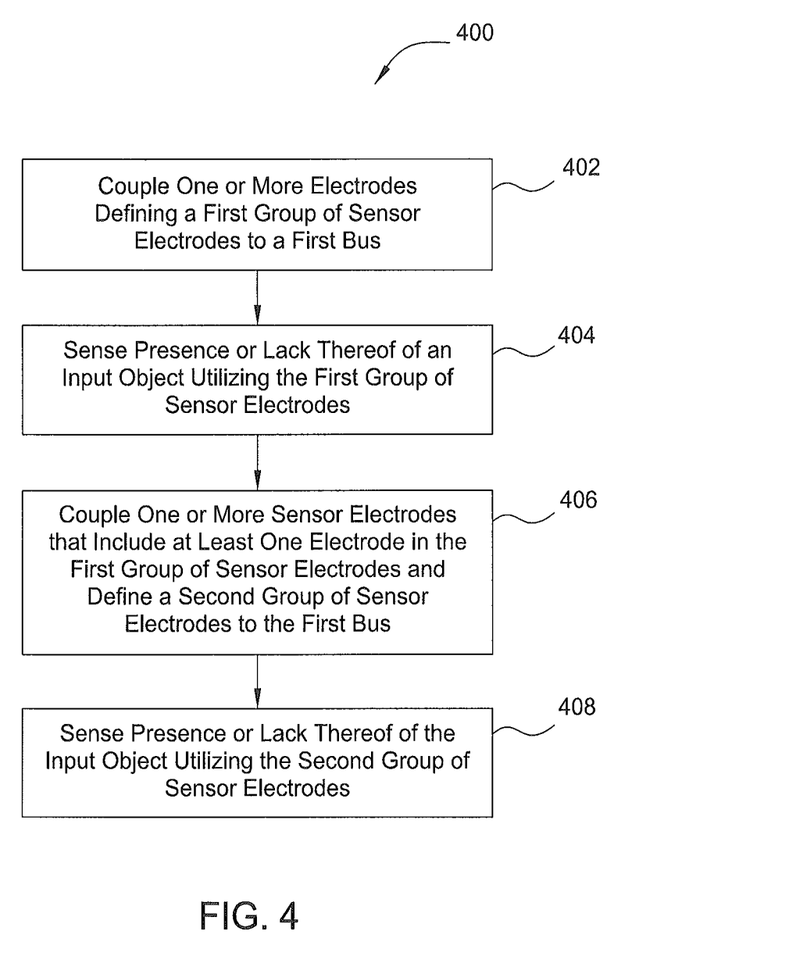
FIG. 4 is a flow diagram illustrating an exemplary method for driving a pattern of sensing elements, according to an embodiment described herein.

FIG. 4 is a flow diagram illustrating an exemplary method 400 for driving a pattern of sensor electrodes, according to an embodiment described herein. Although the method 400 is described in conjunction with FIGS. 1-3, persons skilled in the art will understand that any system configured to perform the method, in any order, falls within the scope of the present invention, and with other patterns of sensor electrodes 202.

The method 400 begins at step 402, where one or more switching elements selectively couple one or more sensor electrodes 202 defining a first group of sensor electrodes to a first bus 204. At step 404, the processing system 110 senses the presence or lack thereof of an input object 140 utilizing the first group of sensor electrodes. The sensing step 404 may drive the first group of sensor electrodes for either absolute or transcapacitance sensing. At step 406, one or more switching elements 206 selectively couple one or more of the sensor electrodes 202 that include at least one electrode defining the first group of sensor electrodes 202 to define a second group of sensor electrodes 202, the second group of sensor electrodes 202 coupled to the first bus through the switching elements 206. The second group of sensor electrodes 202 has a pattern that is different in at least one of location or area compared to the pattern of the first group of sensor electrodes 202. Step 406 may be initiated by a predefined event, such as in response to a predefined touch or proximity event (or lack thereof) of an input object in a sensing region or other event. A predefined touch or proximity event may include a sensing finger being detected in an absolute sensing mode. At step 408, the processing system 110 senses the presence or lack thereof of the input object utilizing the second group of sensor electrodes 202. The sensing step 408 may drive the second group of sensor electrodes for either absolute or transcapacitance sensing. In one embodiment, the sensing step 404 may drive the first group of sensor electrodes for absolute sensing while the sensing step 408 may drive the second group of sensor electrodes for transcapacitance sensing.

Figure 5:
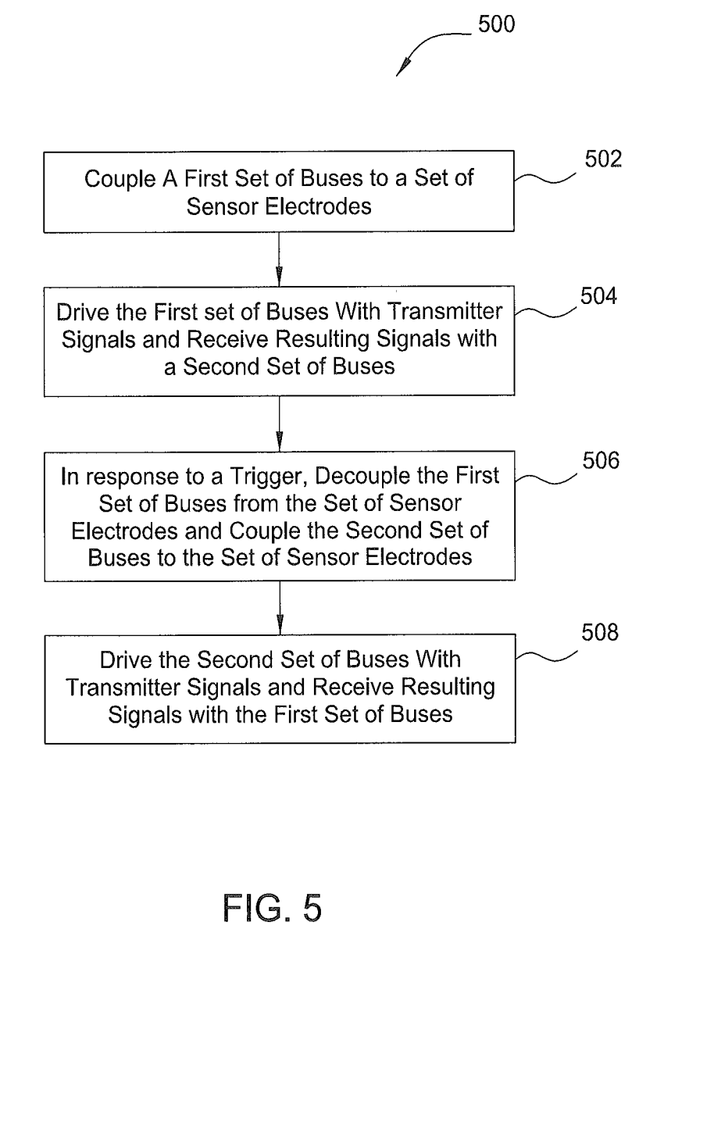
FIG. 5 is a flow diagram illustrating an exemplary method for driving a pattern of sensing elements, according to another embodiment described herein.

FIG. 5 is a flow diagram illustrating exemplary method 500 for driving a pattern of sensor electrodes, according to another embodiment described herein. Although the method 500 are described in conjunction with FIGS. 1-3, persons skilled in the art will understand that any system configured to perform the method steps, in any order, falls within the scope of the present invention.

The method 500 begins at step 502 where a first set of buses is coupled to a set of sensor electrodes to form a pattern. In step 504, the first set of buses is driven with transmitter signals and resulting signals are received with a second set of buses. In step 506, in response to a predefined event, the first set of buses are decoupled from the first set of sensor electrodes and the second set of buses are coupled to the first set of sensor electrodes. In step 508, the second set of buses is driven with transmitter signals and resulting signals are received with the first set of buses.

Advantageously, using switching elements to variably couple either first traces or second traces to sensor electrodes results in the ability to scan an input device in a variety of selectable configurations to utilize different size, location and geometry of the sensor electrodes comprising the pattern could to the processing system, thereby providing flexibility to configure the sensor as desired to better address real time sensing needs.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the foregoing is directed to embodiments of the present invention, other and further embodiments of the invention may be devised without departing from the basic scope thereof, and the scope thereof is determined by the claims that follow.

What is claimed is:

1. An input device comprising:
   a plurality of sensor electrodes;
   a first plurality of buses selectively coupled to the plurality of sensor electrodes;
   a second plurality of buses ohmically separated from the first plurality of buses, the second plurality of buses selectively coupled to the sensor electrodes;
   a plurality of switching elements, wherein each switching element in the plurality of switching elements is paired with a sensor electrode in the plurality of sensor electrodes, and wherein a first switching element in the plurality of switching elements is operable to couple the sensor electrode to either a first bus in the first plurality of buses or a second bus in the second plurality of buses; and
   a processing system coupled to the first plurality of buses and coupled to the second plurality of buses, the processing system configured to:
      drive signals with one or more buses in the first plurality of buses when the one or more buses in the first plurality of buses are selectively coupled to the plurality of sensor electrodes, and
      drive signals with one or more buses in the second plurality of buses when the one or more buses in the second plurality of buses are selectively coupled to the plurality of sensor electrodes.

2. The input device of claim 1, wherein the buses in the first plurality of buses are arranged in a regular pattern.

3. The input device of claim 1, wherein the pairs of switching elements and sensor electrodes are arranged in a regular pattern.

4. The input device of claim 1, wherein the plurality of switching elements are located laterally outward of the plurality of sensor electrodes.

5. The input device of claim 1, wherein each switching element comprises:
   a transistor operable to selectively couple one of the buses to the paired sensor electrode.

6. The input device of claim 1, wherein the first plurality of buses and the second plurality of buses are selectively coupled to transmitter circuitry of a transmitter module of the processing system.

7. The input device of claim 1, wherein the first plurality of buses and the second plurality of buses are selectively coupled to a receiver module of the processing system.

8. The input device of claim 1, wherein the processing system further comprises:
   a determining module configured to:
      determine presence or lack thereof of the input object in response to driving the signals with one or more buses in the first plurality of buses, and
      determine presence or lack thereof of the input object in response to driving the signals with one or more buses in the second plurality of buses.

9. The input device of claim 1, wherein the processing system is further configured to:
   drive transmitter signals with the first plurality of buses when the first plurality of buses is coupled to one or more sensor electrodes in the plurality of sensor electrodes, and
   receive resulting signals with the second plurality of buses when the second plurality of buses is coupled to one or more sensor electrodes in the plurality of sensor electrodes.

10. The input device of claim 1, wherein the processing system is further configured to:
    drive transmitter signals with the second plurality of buses when the second plurality of buses is coupled to one or more sensor electrodes in the plurality of sensor electrodes, and
    receive resulting signals with the first plurality of buses when the first plurality of buses is coupled to one or more sensor electrodes in the plurality of sensor electrodes.

11. The input device of claim 1, wherein the processing system is further configured to:
    drive signals with the first plurality of buses and receive signals with the first plurality of buses in response, when the first plurality of buses is coupled to one or more sensor electrodes in the plurality of sensor electrodes, and
    drive signals with the second plurality of buses and receive signals with the second plurality of buses in response, when the second plurality of buses is coupled to one or more sensor electrodes in the plurality of sensor electrodes.

12. The input device of claim 1, wherein at least one switching element in the plurality of switching elements is configured to simultaneously couple a first bus of the first plurality of buses to two or more sensor electrodes of the plurality of sensor electrodes.

13. A processing system for an input device, the processing system comprising:
    a coupling module comprising coupling circuitry configured to:
       couple one or more sensor electrodes in a plurality of sensor electrodes to a first bus, and
       couple the one or more sensor electrodes to a second bus;
    a transmitter module comprising transmitter circuitry configured to:
       drive first signals on the first bus when the first bus is coupled to the one or more sensor electrodes, wherein driving the first signals causes the first bus to be coupled to the one or more sensor electrodes, and
       drive second signals on the second bus when the second bus is coupled to the one or more sensor electrodes wherein driving the second signals causes the second bus to be coupled to the one or more sensor electrodes; and
    a determining module configured to:
       determine presence or lack thereof of an input object based on signals received in response to driving signals on the first bus when the first bus is coupled to the one or more sensor electrodes; and
       determine presence or lack thereof of the input object based on signals received in response to driving signals on the second bus when the second bus is coupled to the one or more sensor electrodes.

14. The processing system of claim 13, further comprising:
    a receiver module configured to:
       receive first resulting signals with the second bus when the first bus is coupled to one or more sensor electrodes, and
       receive second resulting signals with the first bus when the second bus is coupled to one or more sensor electrodes.

15. The processing system of claim 13, wherein the transmitter module is further configured to:
    receive signals with the first bus when driving the first bus with the first signals; and receive signals with the second bus when driving the second bus with the second signals.

16. The processing system of claim 13, further comprising:
switching circuitry configured to:
couple the one or more sensor electrodes to the first bus, and
couple the one or more sensor electrodes to the second bus.

17. A method for operating an input device, the method comprising:
driving first signals on a first bus, thereby coupling to the first bus one or more sensor electrodes to define a first group of sensor electrodes;
sensing presence or lack thereof of an input object utilizing the driven first signals and the first group of sensor electrodes;
coupling to the first bus one or more sensor electrodes that include at least one sensor electrode of the first group to define a second group of sensor electrodes, the first and second groups of sensor electrodes different in one or more of number or position of the sensor electrodes; and
sensing presence or lack thereof of the input object utilizing the second group of sensor electrodes.

18. The method of claim 17, wherein:
sensing presence or lack thereof of the input object utilizing the first group of sensor electrodes comprises:
coupling the first bus to transmitter circuitry;
coupling a second bus to a receiver module;
driving the first bus with a transmitter signal; and
receiving resulting signals with the second bus.

19. The method of claim 17, wherein:
sensing presence or lack thereof of the input object utilizing the first group of sensor electrodes comprises:
coupling the first bus to transmitter circuitry;
driving the first bus with a signal; and
determining a capacitive coupling measurement between the first group of sensor electrodes and the input object.

* * * * *